United States Patent
Tanaka et al.

(10) Patent No.: US 7,225,614 B2
(45) Date of Patent: Jun. 5, 2007

(54) FLUID COUPLING AND METHOD OF MANUFACTURING FLUID COUPLING

(75) Inventors: Satoshi Tanaka, Hirakata (JP); Teruhiko Tanaka, Neyagawa (JP)

(73) Assignee: Exedy Corporation, Osaka (JP)

( * ) Notice: Subject to any disclaimer, the term of this patent is extended or adjusted under 35 U.S.C. 154(b) by 76 days.

(21) Appl. No.: 10/978,531

(22) Filed: Nov. 2, 2004

(65) Prior Publication Data

US 2005/0103593 A1 May 19, 2005

(30) Foreign Application Priority Data

Nov. 19, 2003 (JP) .............................. 2003-389687

(51) Int. Cl.
*F16H 41/28* (2006.01)
(52) U.S. Cl. ...................... 60/366; 29/889.5; 192/3.29; 192/57; 192/110 B
(58) Field of Classification Search ............... 29/889.5; 60/366, 365; 384/903
See application file for complete search history.

(56) References Cited

U.S. PATENT DOCUMENTS 2,357,295 A * 9/1944 Thompson ................. 29/889.5
3,363,417 A * 1/1968 Becker ......................... 60/365
6,631,795 B2 * 10/2003 Inoue et al. ................... 60/365

FOREIGN PATENT DOCUMENTS

JP    2002-021970    1/2002
JP    2002-021971    1/2002

* cited by examiner

Primary Examiner—Rodney H. Bonck
(74) Attorney, Agent, or Firm—Global IP Counselors, LLP

(57) ABSTRACT

An impeller 3 configures a fluid chamber and includes impeller blades 17 and an annular impeller hub 18. A turbine 4 is disposed to face the impeller 3 and includes turbine blades 22 and an annular turbine hub 23 disposed at an inner peripheral side of the turbine blades 22. A ball bearing 8 is disposed between an inner peripheral surface of the impeller hub 18 and an outer peripheral surface of the turbine hub 23. A first stop ring 34 that engages with a first groove 19 and an engagement groove 31*a* fixes the ball bearing 8 with respect to the impeller hub 18 due to the ball bearing 8 and the impeller hub 18 being brought into close proximity to each other in the axial direction. A second stop ring 35 engaged with a second groove 24*a* fixes the ball bearing 8 and the turbine hub 23.

13 Claims, 4 Drawing Sheets

FLUID COUPLING AND METHOD OF MANUFACTURING FLUID COUPLING

BACKGROUND OF THE INVENTION

1. Field of the Invention

The present invention generally relates to a fluid coupling. More specifically, the present invention relates to a fluid coupling in which an impeller and a turbine are supported so that they are mutually rotatable.

2. Background Information

Conventionally, a fluid coupling is constructed so that an impeller and a turbine face each other. The fluid coupling has a fluid chamber in which hydraulic oil circulates. As shown in Japanese Patent Application Publication No. 2002-21970, a fluid coupling having a bearing (a ball bearing) is disposed between the inner peripheral surface of an impeller hub and the outer peripheral surface of a turbine hub to couple the impeller and the turbine together in the axial direction is known. With this type of fluid coupling it becomes possible to impart concentric precision to the impeller and turbine and support the turbine in the axial direction. Japanese Patent Application Publication No. 2002-21970 is hereby incorporated by reference.

In JP 2002-21970, an inner race of the ball bearing is interposed by a shoulder portion and a stop ring of the turbine hub, and an outer race is interposed by a shoulder portion and a stop ring of the impeller hub, whereby the relative positions of the turbine hub and impeller hub in the axial direction are determined. Here, for convenience sake, the stop ring fixing the outer race will be called a first stop ring, and the stop ring fixing the inner race will be called a second stop ring.

It is thought that the ball bearing in JP 2002-21970 is fixed by the following procedure. First, the outer race of the ball bearing is arranged to contact the inner peripheral surface and the shoulder portion of the impeller hub. Thereafter the first stop ring is locked to the impeller, whereby the outer race is interposed by the shoulder portion and the first stop ring. Next, the inner race is arranged to contact the outer peripheral surface and the shoulder portion of the turbine hub. Thereafter the second stop ring is locked to the turbine hub, whereby the inner race is interposed by the shoulder portion and the second stop ring.

Here, as is apparent from the drawings of JP 2002-21970, it is necessary to pass the second stop ring in the inner peripheral side of the impeller hub in order to lock the second stop ring to the turbine hub in the above-described procedure. For this reason, a special jig becomes necessary when passing the second stop ring on the inner peripheral side of the impeller hub. Thus, the attachment of the ball bearing is complex.

In view of the above, it will be apparent to those skilled in the art from this disclosure that there exists a need for an improved fluid coupling and method of manufacturing a fluid coupling. This invention addresses this need in the art as well as other needs, which will become apparent to those skilled in the art from this disclosure.

SUMMARY OF THE INVENTION

It is an object of the present invention to provide a fluid coupling for which the attachment of the ball bearing disposed between the impeller hub and the turbine hub is easily accomplished.

A fluid coupling according to a first aspect of the present invention is disposed with an impeller, a turbine, a bearing, a first fixing portion, and a second fixing portion. The impeller is a member configuring a fluid chamber and includes impeller blades and an annular impeller hub disposed at an inner peripheral side of the impeller blades. The turbine is disposed inside the fluid chamber facing the impeller and includes turbine blades and an annular turbine hub disposed at an inner peripheral side of the turbine blades. The bearing is disposed between an inner peripheral surface of the impeller hub and an outer peripheral surface of the turbine hub. The first fixing portion fixes the bearing and the impeller hub due to the bearing and the impeller hub being brought into close proximity to each other in an axial direction. The second fixing portion fixes the bearing and the turbine hub.

In this fluid coupling, the bearing is fixed to the impeller hub by moving the turbine hub, to which the bearing is fixed by the second fixing portion, in the axial direction and bringing the turbine hub into close proximity to the impeller hub. For this reason, attaching of the bearing between the impeller hub and the turbine hub is simplified.

A fluid coupling according to a second aspect of the present invention is the fluid coupling of the first aspect, wherein the first fixing portion includes a first elastic member that is elastically deformed when the bearing is fixed with respect to the impeller hub.

In this fluid coupling, in a case in which, for example, the first fixing portion is disposed at the impeller hub, the first elastic member of the first fixing portion contacts the bearing and is elastically deformed, whereby the bearing is fixed with respect to the impeller hub. Thus, the fixing of the bearing to the impeller hub is simplified.

A fluid coupling according to a third aspect of the present invention is the fluid coupling of the second aspect, wherein the first elastic member is an annular member that includes a notch.

In this fluid coupling, in a case in which, for example, the first fixing portion is disposed at the impeller hub, when the first elastic member having a small diameter contacts with the outer peripheral surface of the bearing having a large diameter, the notch portion of the first elastic member expands and the first elastic member is elastically deformed. Thus, the first elastic member pushes against the outer peripheral surface of the bearing, and the bearing is fixed with respect to the impeller hub. For this reason, the fixing of the bearing to the impeller hub is simplified.

A fluid coupling according to a fourth aspect of the present invention is the fluid coupling of the second or third aspect, wherein an engagement groove is formed in an outer peripheral surface of the bearing. Also, a first groove is formed in the inner peripheral surface of the impeller hub. Moreover, the bearing and the impeller hub are fixed by the first elastic member that engages with the engagement groove and the first groove.

In this fluid coupling, in a case in which, for example, the first fixing portion is disposed at the impeller hub, the first elastic member is elastically deformed due to the contact of the first elastic member against the bearing. When the bearing and the turbine hub move further, the first elastic member and the engagement groove engage because the first elastic member is elastically deformed with respect to the engagement groove formed in the bearing so that the first elastic member returns to its free state. Thus, the bearing is fixed with respect to the impeller hub. Due to this configuration, the fixing of the bearing to the impeller hub is simplified.

A fluid coupling according to a fifth aspect of the present invention is the fluid coupling of any of the first to fourth aspects, wherein the second fixing portion includes an annular second elastic member that engages with a second groove formed in the outer peripheral surface of the turbine hub.

In this fluid coupling, the second elastic member is elastically deformed and engages with the second groove of the turbine hub, whereby the bearing is fixed. For this reason, the fixing of the bearing to the turbine hub is simplified.

A fluid coupling according to a sixth aspect of the present invention is the fluid coupling of the fifth aspect, wherein an outer diameter of the second elastic member is larger than an inner diameter of the impeller hub.

In this fluid coupling, a procedure for fixing the bearing to the impeller hub is adopted after the bearing has been fixed to the turbine hub by the second elastic member, whereby the attachment of the second elastic member is not inhibited by the impeller hub. For this reason, restrictions relating to the outer diameter of the second elastic member are released. In addition, it becomes possible to attach easily the second elastic member without using a special jig.

A fluid coupling manufacturing method according to a seventh aspect of the present invention is a method of manufacturing a fluid coupling disposed with an impeller including an annular impeller hub, a turbine including an annular turbine hub, and a bearing disposed between the impeller hub and the turbine hub. The fluid coupling manufacturing method includes a step of fixing the turbine, a step of disposing a first fixing portion, and a step of fixing the impeller. In the step of fixing the turbine, the turbine hub and the bearing are fixed with a second fixing portion. In the step of disposing a first fixing portion, a first fixing portion that fixes the impeller hub and the bearing is disposed at the impeller hub. In the step of fixing the impeller, the bearing and the impeller hub are brought into close proximity to each other in an axial direction and the bearing is fixed to the impeller hub with the first fixing portion.

In this fluid coupling manufacturing method, the bearing is fixed to the turbine hub in the step of disposing the first fixing portion, and the bearing is fixed to the impeller hub in the step of fixing the impeller. Namely, in the step of fixing the impeller, the turbine hub, to which the bearing is fixed, is moved in the axial direction and brought into close proximity to the impeller hub, whereby the bearing is fixed to the impeller hub. For this reason, attaching the bearing between the impeller hub and the turbine hub is simplified.

A fluid coupling manufacturing method according to an eighth aspect of the present invention is the fluid coupling manufacturing method of the seventh aspect, wherein the first fixing portion includes an annular first elastic member that includes a notch. In addition, in the step of disposing the first fixing portion, the first elastic member is arranged to engage with an annular first groove formed in an inner peripheral surface of the impeller hub. Moreover, in the step of fixing the impeller, the first elastic member is elastically deformed by causing an outer peripheral surface of the bearing to contact with the first elastic member, and the first elastic member is arranged to engage with an engagement groove formed in the outer peripheral surface of the bearing.

In this fluid coupling manufacturing method, in the step of fixing the impeller, the first elastic member contacts the bearing and is elastically deformed, whereby the bearing is fixed with respect to the impeller hub. To explain in more detail, the first elastic member contacts the bearing, which has a large-diameter and an annular outer peripheral surface, whereby the notch portion of the first elastic member expands. Thus, the first elastic member is elastically deformed and pushes against the outer peripheral surface of the bearing. When the bearing and the turbine hub move further in the axial direction and the first elastic member is positioned at the portion of the engagement groove, which has a smaller diameter than the other portion of the bearing, the diameter of the first elastic member is reduced by elasticity and the first elastic member engages with the engagement groove. As a result, the bearing is fixed with respect to the inner diameter of the impeller hub. Since the manufacture of the fluid coupling is conducted in this manner, the engagement between the bearing and the impeller hub is simplified.

A fluid coupling manufacturing method according to a ninth aspect of the present invention is the fluid coupling manufacturing method of the seventh or eighth aspect, wherein the second fixing portion includes an annular second elastic member that is engageable with a second groove formed in an outer peripheral surface of the turbine hub. In addition, in the step of fixing the turbine, the bearing is fixed by causing the second elastic member to engage with the second groove.

In this fluid coupling manufacturing method, in the step of fixing the turbine, the second elastic member is arranged to engage with the second groove, whereby the bearing is fixed to the turbine hub. For this reason, it is relatively easy to fix the bearing to the turbine hub.

A fluid coupling manufacturing method according to a tenth aspect of the present invention is the fluid coupling manufacturing method of the ninth aspect, wherein an outer diameter of the second elastic member is larger than an inner diameter of the impeller hub.

In this fluid coupling manufacturing method, the bearing is fixed to the impeller hub after the bearing has been fixed to the turbine hub by the second elastic member, whereby the attachment of the second elastic member is not inhibited by the impeller hub. For this reason, conventional restrictions relating to the outer diameter of the second elastic member are eliminated. In addition, it becomes possible to attach easily the second elastic member without using a special jig.

EFFECTS OF THE INVENTION

In the fluid coupling pertaining to the present invention, the turbine hub, to which the ball bearing is fixed by the second fixing portion, is moved in the axial direction and brought into close proximity to the turbine hub, whereby the ball bearing is fixed to the impeller hub. Thus, the attachment of the bearing between the impeller hub and the turbine hub is simplified.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
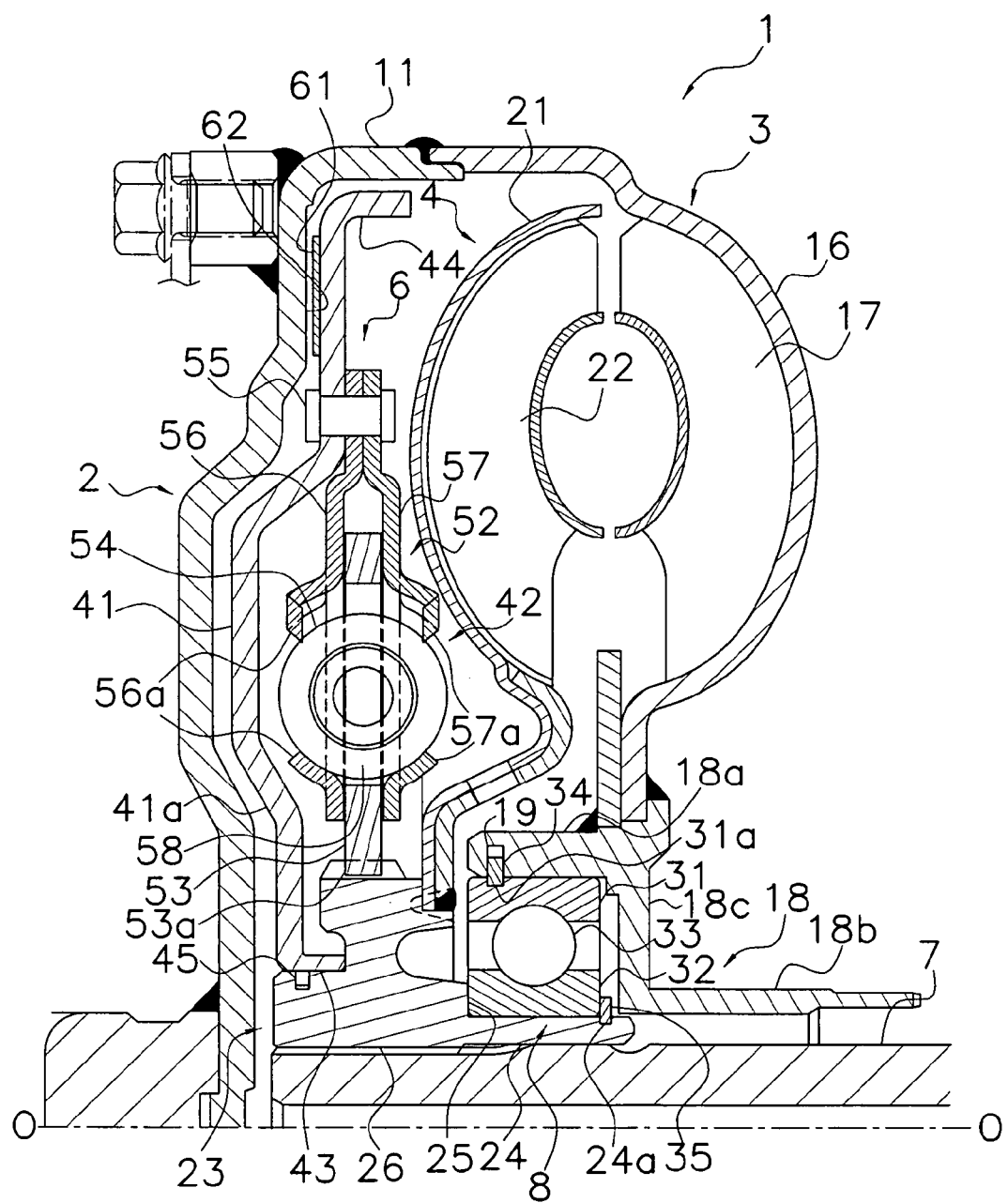
FIG. 1 is a cross-sectional view of a fluid coupling in accordance with a preferred embodiment of present the invention.

FIG. 1 is a cross-sectional view of a fluid coupling 1 in accordance with a preferred embodiment of the present invention. The fluid coupling 1 transmits torque from an engine (not shown) positioned at the left of FIG. 1 to a transmission (not shown) positioned at the right of FIG. 1. Line O—O in FIG. 1 represents the rotational axis of the fluid coupling 1.

Overall Configuration

The fluid coupling 1 is mainly configured by a front cover 2, an impeller 3, a turbine 4, and a lock-up clutch 6.

The front cover 2 is attachable to a constituent part of the unillustrated engine and receives torque inputted from the engine. An outer peripheral protruding portion 11 is bent to protrude towards the transmission side opposite from the engine side is disposed at an outer peripheral portion of the front cover 2.

Figure 4:
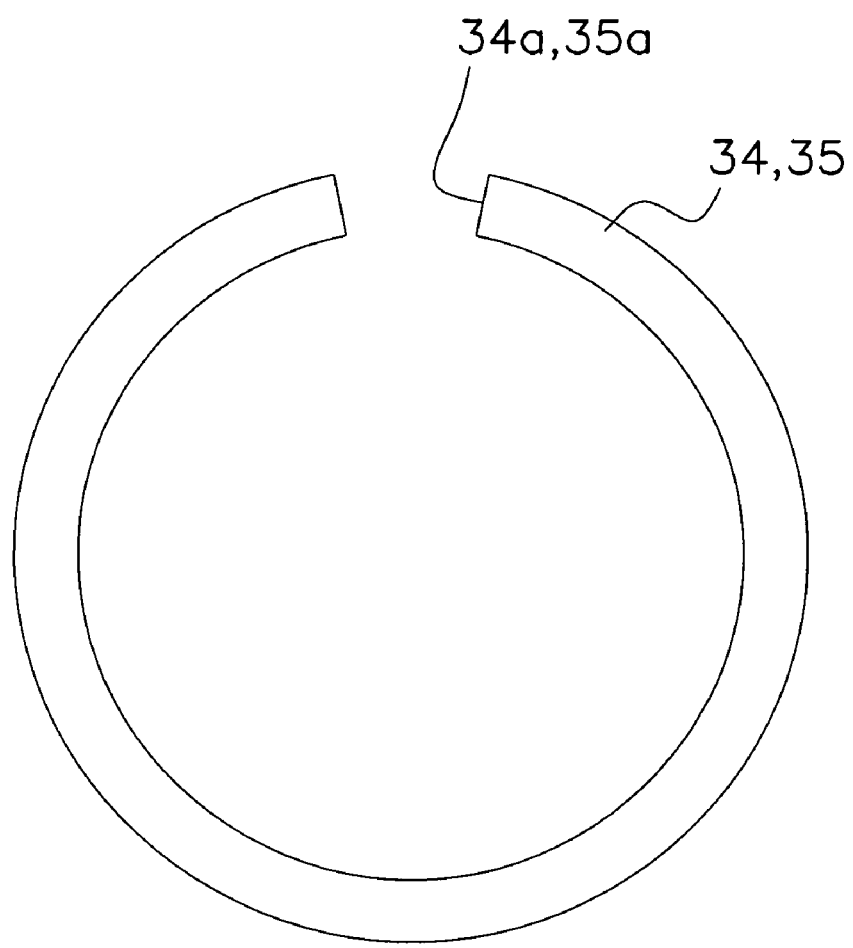
FIG. 4 shows a first and second stop ring that includes a notch.

The impeller 3 is disposed with an impeller shell 16 and a plurality of impeller blades 17 fixed to the impeller shell 16. The impeller shell 16 is fixed to the outer peripheral protruding portion 11 of the front cover 2. A fluid chamber filled with hydraulic fluid is formed inside by the impeller shell 16 and the front cover 2. An inner peripheral end portion of the impeller shell 16 is fixed to an impeller hub 18. The impeller hub 18 is mainly made of a body portion 18c that is a disk-like member. The body portion 18c includes an outer peripheral portion, which is disposed with an outer cylindrical portion 18a that protrudes towards the engine, and an inner peripheral portion, which is disposed with an inner cylindrical portion 18b that protrudes towards the transmission. An inner peripheral surface of the outer cylindrical portion 18a contacts an outer peripheral surface of a ball bearing 8. In addition, a first groove 19, which can engage with a first stop ring (first fixing portion) 34, is formed in the inner peripheral surface of the outer cylindrical portion 18a (in particular, near the end portion towards the engine in the axial direction). The first stop ring 34 is an annular elastic member that includes a notch 34a (see FIG. 4). By engaging the first stop ring 34 in the first groove 19 and further engaging the first stop ring 34 in the ball bearing 8, the ball bearing 8 is fixed to the impeller 3. Here, the outer diameter of the first stop ring 34 in a free state is larger than the inner diameter of the outer cylindrical portion 18a. For this reason, the first stop ring 34 can engage with the first groove 19 by being disposed at a position of the first groove 19 in a state in which the diameter of the first stop ring 34 is reduced and made smaller than the inner diameter of the outer cylindrical portion 18a.

The turbine 4 is disposed inside the fluid chamber at a position facing the impeller 3. The turbine 4 is disposed with a turbine shell 21 and a plurality of turbine blades 22 fixed to the turbine shell 21. An inner peripheral end portion of the turbine shell 21 is fixed to a turbine hub 23 to transmit torque to the transmission. A turbine hub boss 24 that faces the outer cylindrical portion 18a in the radial direction is disposed at the turbine hub 23 to project towards the transmission. In addition, a shoulder portion 25 that is a transmission-side surface of the turbine hub 23 faces the transmission in the axial direction and is formed near the boundary with the turbine hub boss 24. The shoulder portion 25 contacts an engine-side side surface of the ball bearing 8. A second groove 24a that is engageable with a second stop ring (second fixing portion) 35 is formed in an outer peripheral surface of the turbine hub boss 24 (in particular, near the end portion towards the transmission in the axial direction). The second stop ring 35 is an annular elastic member that includes a notch 35a (see FIG. 4). By engaging the second stop ring 35 in the second groove 24a of the turbine hub boss 24, the second stop ring 35 contacts with the transmission-side side surface of the ball bearing 8. Here, the inner diameter of the second stop ring 35 in a free state is smaller than the outer diameter of the turbine hub boss 24. For this reason, the second stop ring 35 can engage with the second groove 24a by being disposed at the position of the second groove 24a in a state in which the diameter of the second stop ring 35 is expanded and made larger than the outer diameter of the turbine hub boss 24. In addition, the turbine hub 23 includes an inner peripheral side disposed with a spline groove 26 that engages with a turbine shaft 7 which transmits the torque to the transmission. The turbine shaft 7 is disposed not to fit together with the front cover 2.

The ball bearing 8 is disposed in a radial-direction space formed by the outer cylindrical portion 18a of the impeller hub 18 and the turbine hub boss 24 of the turbine hub 23 to contact respectively the outer cylindrical portion 18a and the turbine hub boss 24. The ball bearing 8 is separated by a gap from the impeller 18 hub in an axial direction. Since the ball bearing 8 is fixed with respect to both the impeller 3 and the turbine 4, it is possible for the turbine 4 to be rotatably fixed with respect to the impeller 3 in the axial direction and to be supported. The ball bearing 8 is configured by an outer race 31 at an outer peripheral side, an inner race 32 at an inner peripheral side, and a plurality of balls 33 that are rolling bodies arranged to be interposed by the races 3 1and 32. Chamfers are respectively formed at a corner portion formed by an outer peripheral surface and side surface of the outer race 31 and at a corner portion formed by an inner peripheral surface and side surface of the inner race 32. An engagement groove 31a, with which the first stop ring 34 is engageable, is formed in the outer peripheral surface of the outer race 31. The ball bearing 8 and the impeller 3 are fixed by the first stop ring 34 engaged with the first groove 19 of the outer cylindrical portion 18a being engaged with the engagement groove 31a of the outer race 31. The ball bearing 8 is also fixed with respect to the turbine 4 due to the inner race 32 of the ball bearing 8 being interposed by the second stop ring 35 and the shoulder portion 25 of the turbine hub 23.

The lock-up clutch 6 mechanically couples together the front cover 2 and the turbine 4. The lock-up clutch 6 is disposed in the space between the front cover 2 and the turbine 4. The lock-up clutch 6 is mainly made of a piston 41 and a damper mechanism 42.

The piston 41 is a disk-like member that is movable in the axial direction and the circumferential direction, and is disposed in the space between the front cover 2 and the turbine 4. The piston 41 includes an inner peripheral portion, which is disposed with an inner cylindrical portion 43 that is bent to extend from a piston body 41a that is a disk-like member towards the transmission. The piston 41 also includes an outer peripheral portion, which is disposed with an outer cylindrical portion 44 that is bent to extend from the piston body 41a towards the transmission. The inner cylindrical portion 43 is supported to be relatively movable in the axial direction and the circumferential direction with respect to the outer peripheral surface of the turbine hub 23. Here, a seal ring 45 is disposed at the engine-side outer peripheral surface of the turbine hub 23. The seal ring 45 seals the inner peripheral portion of the space between the front cover 2 and the turbine 4.

The damper mechanism 42 is made of a drive member 52 that includes a pair of plate members 56 and 57, a driven member 53, and a plurality of torsion springs 54.

The plate members 56 and 57 that are part of the drive member 52 are arranged next to each other in the axial direction. The plate members 56 and 57 are fixed to each other, and further fixed to the piston 41, by a plurality of rivets 55. Thus, the piston 41 and the drive member 52 integrally rotate. In addition, the plate members 56 and 57 are disposed so that inner peripheral portions thereof are apart from each other in the axial direction. A plurality of cutting portions 56a and 57a arranged in the circumferential direction is formed at the inner peripheral portions of the plate members 56 and 57. The cutting portions 56a and 57a serve as support portions that support the torsion springs 54.

The driven member 53 is a disk-like member and is disposed between the inner peripheral portions of the plate members 56 and 57 in the axial direction. The driven member 53 is engaged with the outer peripheral surface of the turbine hub 23 due to a spline groove 53a formed in an inner peripheral portion of the driven member 53. Thus, the driven member 53 and the turbine hub 23 are relatively movable in the axial direction but integrally rotate in the rotation direction. In addition, a window hole 58 corresponding to the cutting portions 56a and 57a is formed in the driven member 53. The window hole 58 extends in the circumferential direction.

The plurality of torsion springs 54 extends in the circumferential direction and each is housed in the window hole 58 and the cutting portions 56a and 57a. Both circumferential-direction ends of the torsion springs 54 are supported by the window hole 58 and circumferential-direction end portions of the cutting portions 56a and 57a. Moreover, movement of the torsion springs 54 in the axial direction is restricted by the cutting portions 56a and 57a.

A friction facing 61 is disposed at the engine side of the outer peripheral portion of the piston body 41a. A friction surface 62 is formed at the portion of the front cover 2 facing the friction facing 61. The friction facing 61 is provided to ensure the piston 41 and the front cover 2 engage by friction. The engine torque is transmitted from the front cover 2 to the piston 41 due to the friction facing 61 and the friction surface 62 contacting with each other and frictionally engaging. Moreover, the torque is transmitted to the transmission via the damper mechanism 42, the turbine hub 23, and the turbine shaft 7.

Manufacturing Method

Figure 2:
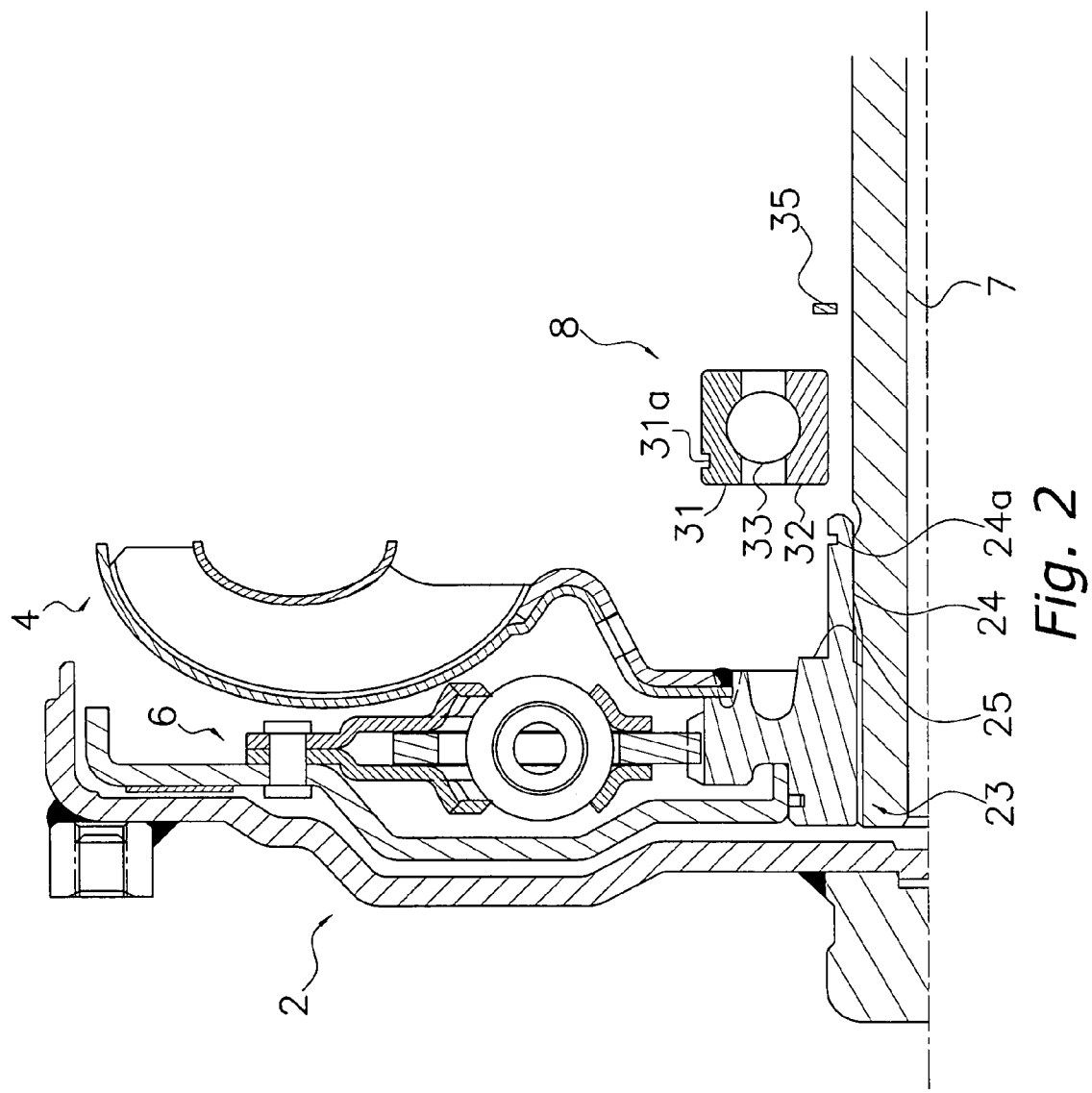
FIG. 2 is a cross-sectional view illustrating an assembly process of the fluid coupling, and showing a state in which a turbine and a ball bearing of the fluid coupling are separated.

FIG. 2 is a cross-sectional view of the fluid coupling 1 in a state in which the ball bearing 8 is separated from the other members. Below, the manufacturing method of the fluid coupling 1, which is a characteristic portion of the present invention, from the state shown in FIG. 2, and namely the procedure of disposing the ball bearing 8 between the impeller 3 and the turbine 4, will be described.

First, the turbine hub boss 24 and the ball bearing 8 are fixed. The inner peripheral surface of the inner race 32 of the ball bearing 8 is disposed to contact the outer peripheral surface of the turbine hub boss 24. At this time, the ball bearing 8 is first disposed at a position where the engine-side side surface of the inner race 32 contacts the shoulder portion 25 of the turbine hub 23. Next, the second stop ring 35 is engaged with the second groove 24a of the turbine hub boss 24. Here, the second stop ring 35 is deformed so that its diameter is expanded to engage the second stop ring 35 in the second groove 24a. When the second stop ring 35 engages with the second groove 24a, the inner race 32 is interposed in the axial direction with respect to the turbine 4 by the second stop ring 35 and the shoulder portion 25. As a result, the positions of the turbine 4 and the ball bearing 8 in the axial direction are fixed.

Figure 3:
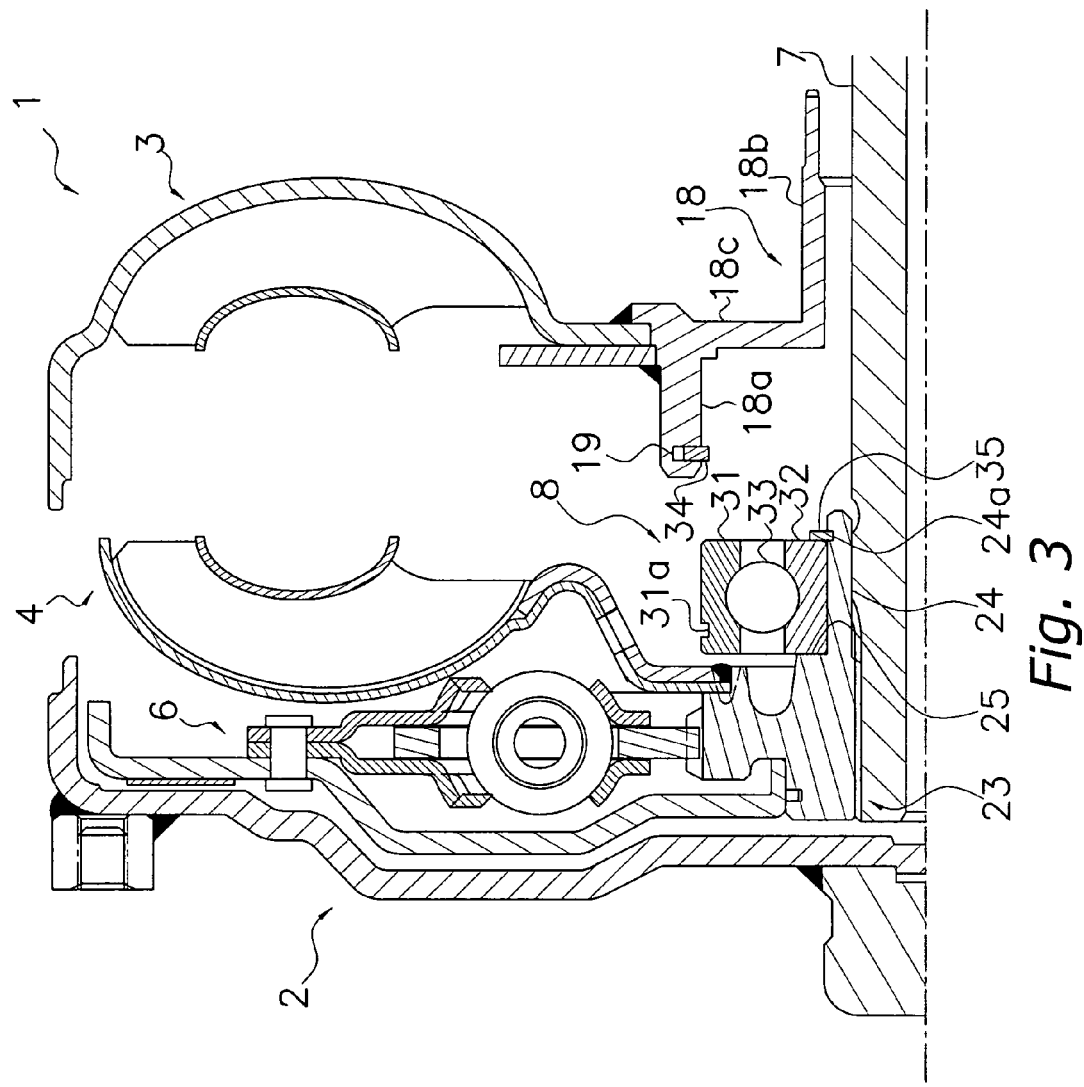
FIG. 3 is a cross-sectional view further illustrating the assembly process of the fluid coupling, and showing a state in which the ball bearing is fixed to the turbine.

Referring now to FIG. 3, the first stop ring 34 engages with the first groove 19 of the outer cylindrical portion 18a of the impeller hub 18. At this time, the first stop ring 34 is deformed so that its diameter is expanded to engage the first stop ring 34 in the first groove 19. By conducting the above operation, the fluid coupling 1 reaches the state shown in FIG. 3.

Next, the turbine 4 and the impeller 3 are brought into close proximity to each other in the axial direction. Thus, the first stop ring 34 contacts the transmission-side side surface of the outer race 31 of the ball bearing 8. Since the corner portion at which the outer peripheral surface and the side surface of the outer race 31 intersect is chamfered, the diameter of the first stop ring 34 expands along the surface of the outer race 31 as it is further moved in the axial direction. Thus, the elastically deformed first stop ring 34 skids in the axial direction while pushing against the outer peripheral surface of the outer race 31. When the first stop ring 34 is positioned at the portion of the engagement groove 31a of the outer race 31, the shape of the elastically deformed first stop ring 34 returns to normal, the diameter shrinks, and the first stop ring 34 engages with the engagement groove 31a. Thus, the impeller 3 and the ball bearing 8 are fixed to each other.

Characteristics

In the fluid coupling 1 of the present embodiment, by disposing the ball bearing 8 between the impeller hub 18 and the turbine hub 23, and more specifically between the outer cylindrical portion 18a and the turbine hub boss 24, the concentric precision between the impeller 3 and the turbine 4 is secured and both are positioned in the axial direction.

As shown in FIG. 1, the impeller 3, the turbine 4, and the ball bearing 8 are fixed to each other as follows. The inner race 32 of the ball bearing 8 is axially interposed by the shoulder portion 25 disposed at the turbine hub 23 and the second stop ring 25 engaged with the second groove 24a of the turbine hub boss 24, whereby the ball bearing 8 is fixed with respect to the turbine 4. In addition, the first stop ring 34 that is engaged with the first groove 19 of the outer cylindrical portion 18a engages with the engagement groove 31a of the outer race 31, whereby the ball bearing 8 is fixed with respect to the impeller 3. Thus, positioning of the impeller 3 and the turbine 4 are positioned in the axial direction via the ball bearing 8.

Further, the outer peripheral surface of the outer race 31 and the inner peripheral surface of the outer cylindrical portion 18a contact each other. Moreover, the inner peripheral surface of the inner race 32 and the outer peripheral surface of the turbine hub boss 24 contact each other. Thus, the concentric precision between the impeller 3 and the turbine 4 is secured via the ball bearing 8.

The shoulder portion 25 and the second stop ring 35 interpose the inner race 32, and thus, they fix the ball bearing 8 with respect to the turbine 4. The second stop ring 35 is an annular elastic member that includes a notch 35*a*. As the procedure for manufacturing the fluid coupling 1, the ball bearing 8 is fixed with respect to the turbine 4 before the impeller 3. For this reason, the ball bearing 8 can be disposed and the second stop ring 35 can be attached in a state (see FIG. 2) in which the transmission-side direction of the turbine 4 is open. Thus, labor for attaching the second stop ring 35 in the second groove 24*a* via the inner side of the impeller hub 18 (inner cylindrical portion 18*b*) and a special jig that is necessary to use at that time in conventional assemblies become unnecessary. Further, the attachment of the second stop ring 35 is simplified. In addition, the conventional restriction of the second stop ring 35 (restriction of the outer diameter of the second stop ring that arises when the second stop ring is attached via the inner diameter of the inner cylindrical portion) is released. Thus, it is possible to make the outer diameter of the second stop ring 35 larger than the inner diameter of the inner cylindrical portion 18*b*.

The first stop ring 34 engaged with the first groove 19 engages with the engagement groove 31*a*, whereby the first stop ring 34 fixes the ball bearing 8 with respect to the impeller 3. The first stop ring 34 is also an annular elastic member that includes a notch 34*a*. In order for the first stop ring 34 that is engaged with the first groove 19 to engage with the engagement groove 31*a*, first the ball bearing 8 (fixed to the turbine 4) and the impeller 3 are brought into close proximity to each other in the axial direction, and then the first stop ring 34 is caused to contact with the outer peripheral surface of the outer race 31, whereby the first stop ring 34 is caused to deform and to expand. When the first stop ring 34 reaches the position of the engagement groove 31*a*, the diameter of the first stop ring 34 is reduced and the first stop ring 34 engages with the engagement groove 31*a*. In this manner, the fixing of the ball bearing 8 to the impeller 3 becomes easy.

ALTERNATE EMBODIMENTS

Alternate embodiments will now be explained. In view of the similarity between the first and alternate embodiments, the parts of the alternate embodiments that are identical to the parts of the first embodiment will be given the same reference numerals as the parts of the first embodiment. Moreover, the descriptions of the parts of the alternate embodiments that are identical to the parts of the first embodiment may be omitted for the sake of brevity.

An embodiment of the fluid coupling according to the present invention was described above, but the invention is not limited to this embodiment. Various alterations and modifications are possible without deviating from the scope of the invention.

For example, in the fluid coupling 1, the first stop ring 34, which is an elastic member including a notch 34*a*, is arranged to engage with the first groove 19 and the engagement groove 31*a*, whereby the impeller 3 and the ball bearing 8 are fixed. Here, the impeller 3 and the ball bearing 8 may also be fixed by respectively disposing holes in the outer cylindrical portion 18*a* of the impeller hub 18 and in the outer race 31 of the ball bearing 8, and causing elastic members such as springs to engage with these holes instead of the first stop ring 34.

In addition, in the fluid coupling 1, the inner race 32 is interposed by the shoulder portion 25 and the second stop ring 35, thus the ball bearing 8 is fixed with respect to the turbine 4. Here, other convenient fixing structures may be used in order to fix the ball bearing 8 with respect to the turbine 4. For example, the ball bearing 8 may be fixed to the turbine hub 23 by disposing screw holes in the turbine hub 23 and disposing, in the inner race 32, holes through which screws can pass.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-389687. The entire disclosure of Japanese Patent Application No. 2003-389687 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A fluid coupling comprising:
   a front cover;
   an impeller being arranged axially opposite said front cover to form a fluid chamber, said impeller including impeller blades and an annular impeller hub being disposed at an inner peripheral side of said impeller blades;
   a turbine being disposed inside said fluid chamber axially between said front cover and said impeller to face said impeller, said turbine including turbine blades and an annular turbine hub being disposed at an inner peripheral side of said turbine blades;
   a bearing disposed between an inner peripheral surface of said impeller hub and an outer peripheral surface of said turbine hub;
   a first fixing portion being configured to fix said bearing to said impeller hub; and
   a second fixing portion being configured to fix said bearing to said turbine hub, said second fixing portion being an annular member having an outer diameter larger than an inner diameter of said impeller hub.

2. The fluid coupling according to claim 1, wherein said first fixing portion includes a first elastic member that is elastically deformed when said bearing is fixed with respect to said impeller hub.

3. The fluid coupling according to claim 2, wherein said first elastic member is an annular member including a notch.

4. The fluid coupling according to claim 3, wherein
an engagement groove is formed in an outer peripheral surface of said bearing,
a first groove is formed in said inner peripheral surface of said impeller hub, and
said bearing and said impeller hub are fixed by said first elastic member engaging with said engagement groove and said first groove.

5. The fluid coupling according to claim 4, wherein said second fixing portion is elastic and engages with a second groove formed in said outer peripheral surface of said turbine hub.

6. The fluid coupling according to claim 3, wherein said second fixing portion is elastic and engages with a second groove formed in said outer peripheral surface of said turbine hub.

7. The fluid coupling according to claim 2, wherein
an engagement groove is formed in an outer peripheral surface of said bearing,
a first groove is formed in said inner peripheral surface of said impeller hub, and
said bearing and said impeller hub are fixed by said first elastic member engaging with said engagement groove and said first groove.

8. The fluid coupling according to claim 7, wherein said annular member is an annular second elastic member that engages with a second groove formed in said outer peripheral surface of said turbine hub.

9. The fluid coupling according to claim 2, wherein said annular member is an annular second elastic member that engages with a second groove formed in said outer peripheral surface of said turbine hub.

10. The fluid coupling according to claim 1, wherein said annular member is an annular second elastic member that engages with a second groove formed in said outer peripheral surface of said turbine hub.

11. A fluid coupling manufacturing method comprising:
interposing a bearing between a shoulder portion of a turbine hub of a turbine and an annular second fixing portion;
arranging an impeller axially opposite said turbine to fix an impeller hub of said impeller having an inner diameter smaller than an outer diameter of said annular second fixing portion and said bearing by a first fixing portion by moving said bearing and said impeller hub toward each other in an axial direction and fixing said bearing to said impeller hub by said first fixing portion;
preparing said first fixing portion to include an annular first elastic member including a notch; and
causing said first elastic member to engage with an annular first groove formed in an inner peripheral surface of the impeller hub when arranging said impeller axially opposite said turbine such that said first elastic member is elastically deformed when contacting an outer peripheral surface of said bearing, and said first elastic member is arranged to engage with an engagement groove formed in said outer peripheral surface of said bearing when arranging said impeller axially opposite said turbine.

12. The fluid coupling manufacturing method according to claim 11, further comprising
preparing said annular second fixing portion to include an annular second elastic member that engages with a second groove formed in an outer peripheral surface of said turbine hub when interposing said bearing between said shoulder portion and said annular second fixing portion.

13. A fluid coupling comprising:
a front cover;
an impeller being arranged axially opposite said front cover to form a fluid chamber, said impeller including impeller blades and an annular impeller hub being disposed at an inner peripheral side of said impeller blades;
a turbine being disposed inside said fluid chamber axially between said front cover and said impeller to face said impeller, said turbine including turbine blades and an annular turbine hub being disposed at an inner peripheral side of said turbine blades;
a bearing disposed between an inner peripheral surface of said impeller hub and an outer peripheral surface of said turbine hub;
a first fixing portion being configured to fix said bearing to said impeller hub, said first fixing portion including a first groove being formed in an inner peripheral surface of said impeller and a first elastic member engaging with said first groove and being deformable in an outer radial direction within said first groove, said first elastic member being elastically deformed when contacting an outer peripheral surface of said bearing, said first elastic member being arranged to engage with an engagement groove formed in said outer peripheral surface of said bearing; and
a second fixing portion being configured to fix said bearing to said turbine hub.

* * * * *